United States Defensive Publication [19] (H) [11] T960,002

Moon [43] July 5, 1977

[54] FUEL ENRICHMENT CONTROL CIRCUIT FOR AN INTERNAL COMBUSTION ENGINE

[76] Inventor: Roger A. Moon, 1659 Sheffield Road, Ypsilanti, Mich. 48197

[21] Appl. No.: 663,662

[22] Filed: Mar. 4, 1976

Related U.S. Application Data

[63] Continuation of Ser. No. 519,156, Oct. 30, 1974, abandoned.

[51] Int. Cl.[2] ..... F02B 3/00

[52] U.S. Cl. ..... 123/32 EA; 123/179 G

[57] ABSTRACT

An internal combustion engine fuel enrichment control circuit which produces an output electrical signal suitable for use in modifying an engine fuel demand electrical signal when the temperature of the engine is below its normal operating temperature. The output signal has a fixed magnitude when the engine is not being cranked or started and the angular acceleration of the engine output shaft is less than a predetermined magnitude. The output electrical signal is proportional to the temperature of the engine when the engine is being cranked or started and also when the angular acceleration of the engine output shaft is greater than the predetermined magnitude. The angular acceleration of the engine is used as an indication of the roughness of operation of the engine. The output electrical signal proportional to engine temperature effects fuel enrichment by the modification of a fuel demand signal that represents engine fuel demand when the engine is at its normal operating temperature. In a preferred embodiment the invention includes an engine temperature sensing and switching circuit, a gain control and output circuit, an engine speed sensing circuit, a filter and differentiator circuit for producing a signal proportional to acceleration of the engine's output shaft and a cold start control circuit.

6 Claims, 1 Sheet Drawing,

27 Pages Specification

The file of this unexamined application may be inspected and copies thereof may be purchased (849 O.G. 1221, Apr. 9, 1968).

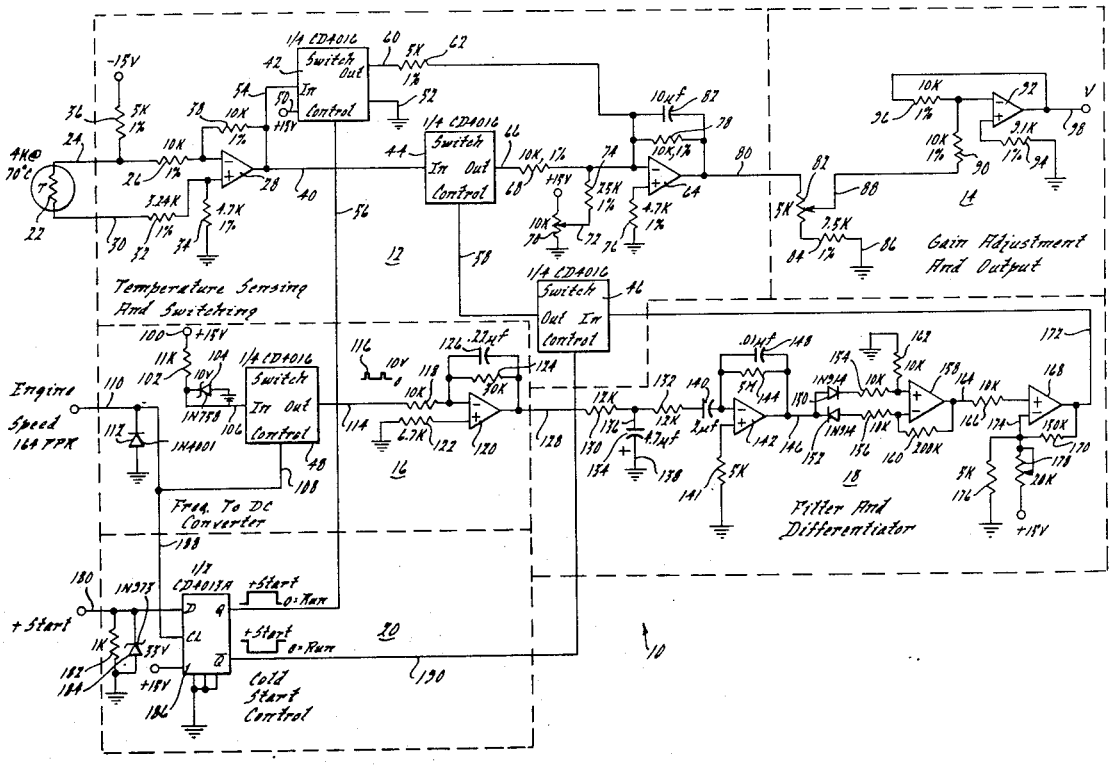

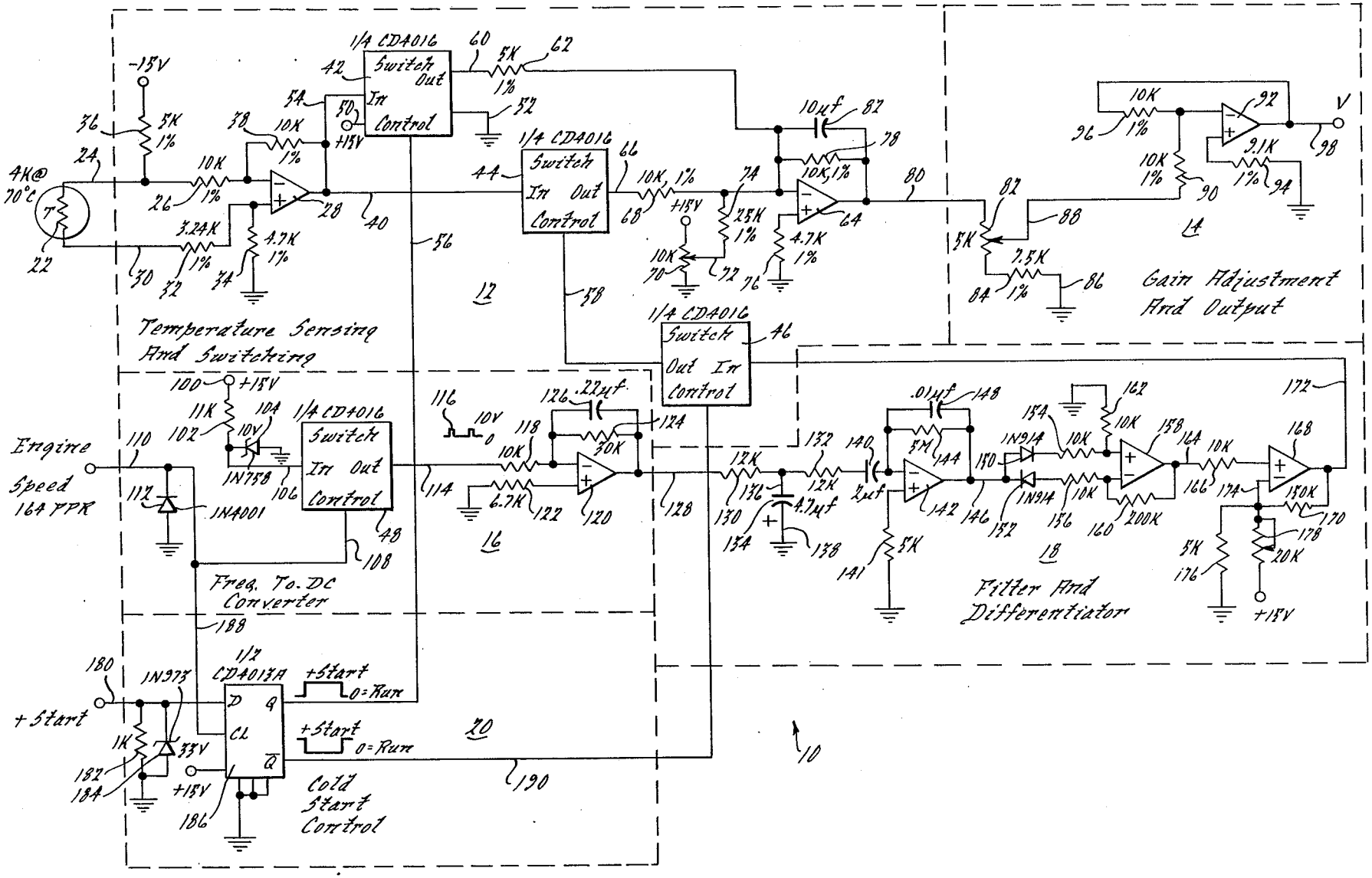
Gain Adjustment And Output
Filter And Differentiator
Temperature Sensing And Switching
Freq. To DC Converter
Cold Start Control
1/4 CD4016 Switch Out In Control
1/2 CD4013A
Engine Speed 164 PPR
+Start
Run
+15V
-15V
10V
33V
1N4001
1N759
1N914
1N933
4K@ 70°C